United States Patent [19]

Nishibe

[11] Patent Number: 4,802,194
[45] Date of Patent: Jan. 31, 1989

[54] TIME MEASURING SYSTEM WITH LARGE DYNAMIC RANGE

[75] Inventor: Takashi Nishibe, Kanagawa, Japan

[73] Assignee: Fuji Electric Co., Ltd., Kanagawa, Japan

[21] Appl. No.: 14,252

[22] Filed: Feb. 11, 1987

[30] Foreign Application Priority Data

Mar. 5, 1986 [JP] Japan .................................. 61-46277

[51] Int. Cl.⁴ .......................... H03M 7/00; G06G 7/24
[52] U.S. Cl. ...................................... 377/20; 328/145;
328/129.1; 307/492; 354/427
[58] Field of Search ............... 377/20, 107; 328/129.1,
328/145; 307/492; 354/427

[56] References Cited

U.S. PATENT DOCUMENTS

| | | | |
|---|---|---|---|
| 3,586,835 | 6/1971 | Foeh | 377/20 |
| 3,745,475 | 7/1973 | Turner | 377/20 |
| 4,052,676 | 10/1977 | Crittenden | 377/20 |
| 4,213,683 | 7/1980 | Furukawa | 307/492 |
| 4,255,793 | 3/1981 | Nakamura | 328/145 |
| 4,397,031 | 8/1983 | Weber | 377/20 |

Primary Examiner—John S. Heyman
Attorney, Agent, or Firm—Finnegan, Henderson, Farabow, Garrett, & Dunner

[57] ABSTRACT

A time interval measuring system includes circuitry for generating a signal indicating the beginning and end of a time interval, a clock to generate a periodically increasing clock signal, and a counter to count the clock signal between the beginning and end of the interval. The periodically increasing clock signal comprises a series of pulses each of which has a pulse period which is longer than the pulse period of the preceding pulse by a predetermined ratio greater than one.

5 Claims, 3 Drawing Sheets

TIME MEASURING SYSTEM WITH LARGE DYNAMIC RANGE

BACKGROUND OF THE INVENTION

This invention relates to time measuring systems, and more particularly to time measuring systems which are suitable for automatic focus cameras or other systems requiring a large dynamic range for time measurement.

In many automatic focus cameras, distance is measured by triangulation. To use that principle, two optical systems in the cameras form an image of an object on two light receiving element (or photo-sensor) arrays. The distance between the object and the camera is then determined by correlating the differences between the two images.

One method of converting an optical representation of the object's image into an electrical signal is shown in FIGS. 1-3. FIG. 1 is a circuit diagram of a photosensor in a photosensor array. FIG. 2 is a timing chart showing the operation of the photosensor in FIG. 1. FIG. 3 is a block diagram of a distance measuring device using photosensors such as those shown in FIG. 1.

In FIG. 1, a photosensor 10 includes a photodiode 11, a coupling capacitance (or a capacitor) 12, an inverter 13, and a reset transistor 14. Photosensor 10 is started by a RESET signal (FIG. 2(a)) which renders transistor 14 conductive causing capacitor 12 to discharge. At the end of the RESET signal, capacitor 12 begins integrating the current through photodiode 11 and produces a voltage V as shown in FIG. 2(b). When the voltage V reaches a predetermined value, shown in FIG. 2(b) as $V_{th}$, the threshold voltage of inverter 13 in FIG. 1, the inverter 13 changes state and the output S of inverter 13 drops to a low ("L") level, as shown in FIG. 2(c).

The circuit in FIG. 1 thereby converts received light intensity into a binary signal S according to the time required for the integration voltage to reach the threshold voltage $V_{th}$. Photosensor 10 in FIG. 1 is also referred to as a "conversion element" or "conversion sensor," and the integration time of capacitor 12 (time T in FIG. 2(c)) is also referred to as a "conversion element time" or "sensor response time."

One disadvantage of such circuit is that the change in V with time, dV/dt, depends on the quantity of light received. Therefore, different sensors sometimes provide different outputs for the same light. This disadvantage can be exacerbated in a distance measuring device which includes several photosensors 31 of the type shown in FIG. 1.

Such a device is shown in FIG. 3. The outputs $Si_1$, $Si_2$... $Si_n$ of photosensors 31 are each inputs to a different one of AND gates 33a, 33b... 33n (collectively denoted 33). A clock pulse $\phi_1$ is a second input to each AND gate 33. The outputs of AND gates 33 are each an input to a different one of counters 44a, 44b... 44n (collectively denoted 44) which digitally quantize the photosensors' response times.

If the measuring device of FIG. 3 uses a short clock pulse period (high frequency) to ensure accurate measurement of short time periods, then the device must include a great deal of additional circuitry, such as counters, to measure long time periods also.

Accordingly, an object of this invention is to provide a time-measuring system which can accurately measure a wide range of time periods without needlessly increasing the amount or complexity of associated circuitry.

SUMMARY OF THE INVENTION

To obtain the object and in accordance with the principles of the invention, a system is provided for measuring a time interval which comprises: sensing means for generating a signal to indicate a beginning and end of the time interval; clock means for generating a clock signal composed of a plurality of pulses, each of the pulses having a pulse period longer than the pulse period of an immediately preceding pulse by a predetermined ratio greater than one; and counter means, coupled to the sensing means and the clock means, for counting the number of clock pulses in the clock signal generated between the beginning and end of the time interval.

The accompanying drawings, which are incorporated in and constitute a part of this specification, illustrate a preferred embodiment of the invention and, together with the description of the invention, serve to explain the principles of the invention.

DESCRIPTION OF THE PREFERRED EMBODIMENT

Reference will now be made to the accompanying figures showing a preferred embodiment of this invention.

Figure 1:
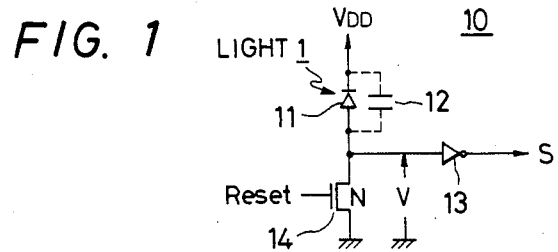
FIG. 1 is a circuit diagram of a conventional photosensor.
Figure 2:
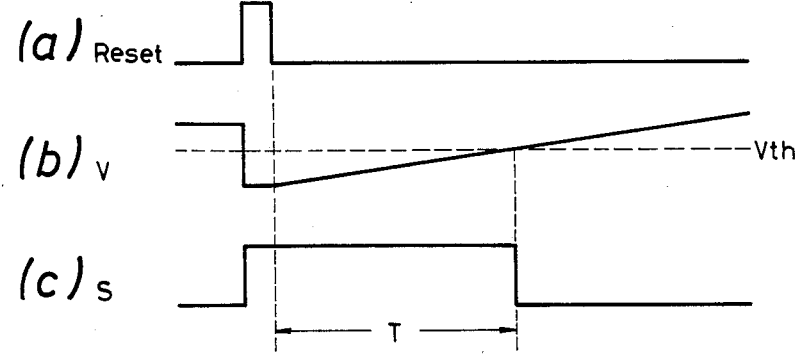
FIG. 2 is a timing chart of signals generated by the photosensor in FIG. 1.
Figure 3:
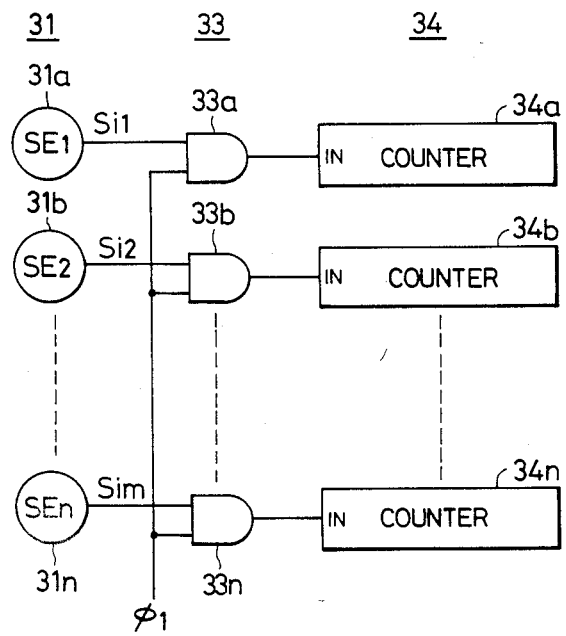
FIG. 3 is a time-measurement system using the photosensors of FIG. 1.
Figure 4:
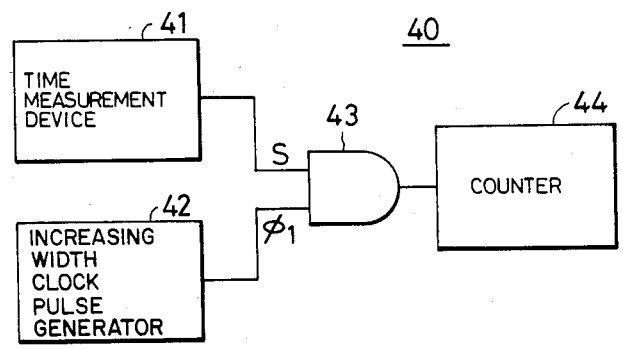
FIG. 4 is a block diagram of one embodiment of a time interval measurement system of this invention.

FIG. 4 is a block diagram of one embodiment of a time interval measurement system 40 according to this invention. The system of this invention includes sensing means for generating a signal to indicate the beginning and end of a time interval. Time measurement device 41, which can be the photosensor 10 shown in FIG. 1, generates an output signal S. The period of time during which the output signal S of the device 41 is at a high (or "H") level corresponds to time interval T (Fig. 2(c)).

The system of this invention also includes clock means for generating a clock signal composed of a plurality of pulses having a pulse period which is larger than the pulse period of an immediately preceding pulse by a predetermined ratio greater than one. In accordance with a preferred embodiment of this invention, an increasing width clock pulse generating circuit 42 acts as a clock means and generates a clock pulse $\phi_1$ composed of individual pulses whose periods t successively increase by a ratio a. The clock pulses can be expressed as:

$$t_{n+1} = a \cdot t_n$$

where $t_n$ is the period of the nth clock pulse, $t_{n+1}$ is the period of the (n+1)th clock pulse, and a is a constant number, not necessarily an integer, but greater than one.

The period of time which elapses from the start of generation of the clock pulse until the (n−1)th clock pulse is:

$$T = \sum_{i=1}^{n-1} t_i = \frac{a^n - 1}{a - 1} t_0$$

where $t_0$ is the period of the first clock pulse.

When n is sufficiently large such that $a^n \gg 1$, the preceding expression can be approximated as follows:

$$T = \Sigma t_i \simeq \frac{t_0}{a - 1} a^n$$

Transformed into logarithms, this equation becomes:

$$\log T = n \log a + \log \frac{t_0}{a - 1}$$

The present invention uses this relationship to obtain its objects.

If the measurement starts ($t_0/(a-1)$) units earlier than the clock pulse start time, then the preceding two expressions can be established without approximation.

The time interval measuring system of this invention also includes counter means for counting the number of clock pulses in the clock signal generated between the beginning and end of the time interval. In the preferred embodiment of the invention shown in FIG. 4, AND gate 43 logically ANDs the clock signal $\phi_1$ and the output signal S and applies its output to a counter 44. The output of the counter corresponds to log T as explained above, which is a digital quantization of the duration of the time interval.

If there are two time measurement devices instead of one, the outputs of the two time measurement should be EXCLUSIVE-ORed before being applied to AND gate 43. In this way the difference in the time between which two events occur can be measured by counting the clock pulses during that interval. The count result $\Delta N$ can be used in the following expression:

$$\Delta N = (\log T_1/T_2)/\log a$$

where $T_1$ and $T_2$ are, respectively, the times that the two events occur after the clock pulse start time.

Figure 5:
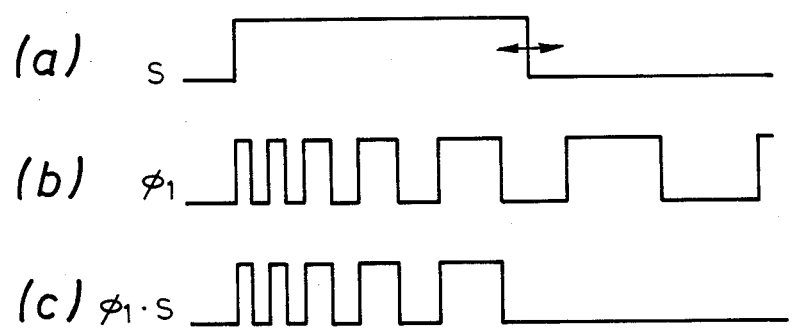
FIG. 5 is a timing chart of signals generated in the time interval measurement system of FIG. 4.

FIG. 5 is a timing chart for several signals generated by the circuit in FIG. 4 and is useful for describing the operation of the circuit in FIG. 4. The output signal S and the clock signal $\phi_1$ are shown in FIGS. 5(a) and (b), respectively. The signal $\phi_1 S$ out of AND gate 43 FIG. 5(c)) is counted by counter 44.

Figure 6:
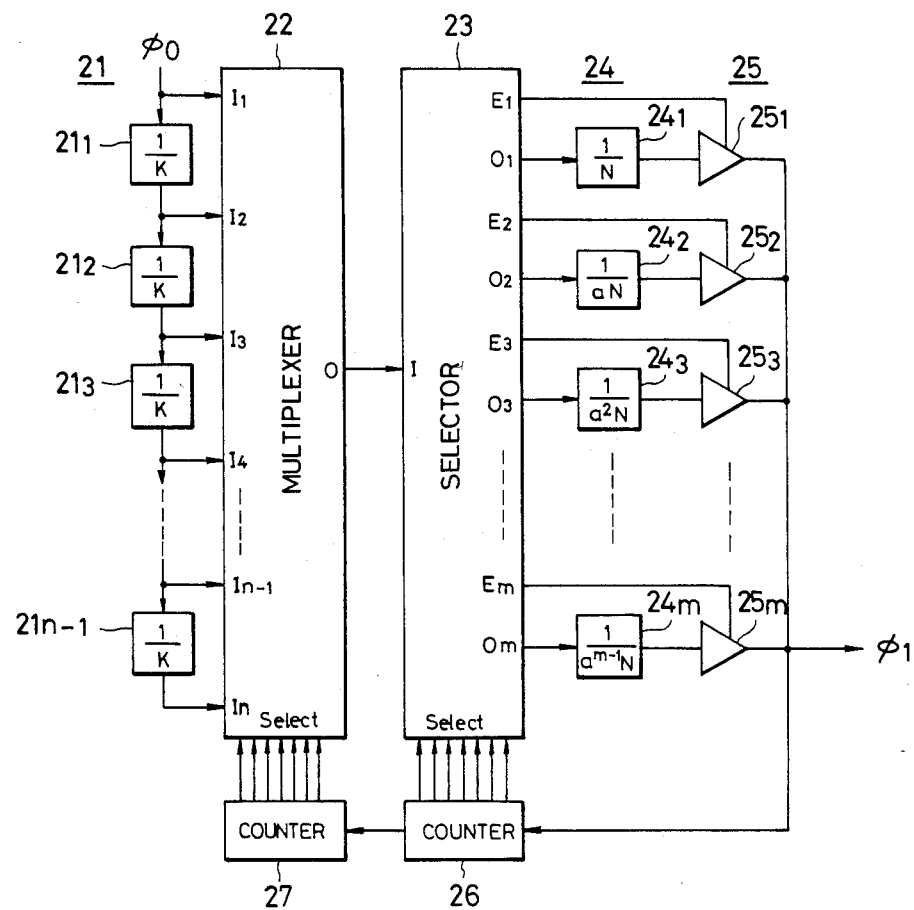
FIG. 6 is a detailed circuit diagram of a clock pulse generating circuit shown in FIG. 4.

FIG. 6 is a block diagram of a preferred embodiment of clock pulse generating circuit 41. In FIG. 6, elements $21_1$ through $21_{n-1}$ are each a 1/K frequency divider (K being a positive integer). Frequency dividers $21_1$ through $21_{n-1}$ are serially connected and frequency divider $21_1$ receives a constant frequency reference clock signal $\phi_0$ as its input.

A multiplexer 22 selects one of n input signals at input terminals $I_1$ through $I_n$ according to a first select signal at a SELECT input terminal and provides that selected input signal at an output terminal O. Input terminal $I_1$ is connected to receive clock pulse $\phi_0$ and input terminals $I_2$-$I_n$ are each connected to the output of a different frequency divider $21_1$ to $21_{n-1}$ as shown in FIG. 6.

Selector 23 has an input terminal I connected to output terminal O of multiplexer 22. Selector 23 routes the signal at input terminal I to one of its outputs $O_1$ through $O_m$ and activates one of its corresponding enable outputs $E_1$-$E_m$ according to a second select signal at a SELECT terminal.

Frequency dividers $24_1, 24_2 \ldots 24_m$ are each connected to a different one of outputs $O_1$-$O_m$ from multiplexer 23. Each of frequency dividers $21_1$-$24_m$ subject the signal at the corresponding $O_1$-$O_m$ to additional frequency division. A frequency divider $24_p$ divides the frequency of the signal at output $O_p$ of selector 23 by $a^{p-1} \cdot N$. The value a, as defined above, is the ratio between successive periods of the clock pulse. The integer N in the denominator is needed to permit realization of $1/a^p$ frequency dividers when a is not an integer. N is chosen so that $a^p$ can approximate an integer. For instance, if $a = 2^{1/3}$ (1.259), N can be set to 100, so the frequency dividers $21_1, 24_2, 24_3 \ldots$ have frequency division ratios 1/100, 1/126, 1/159 ....

Gates $25_1, 25_2 \ldots 25_m$ are tri-state gates which can be in an "H," "L," or "High Impedance" state. Enable inputs $E_1$ through $E_m$ from selector 23 are applied to the state inputs of tri-state gates $25_1$ through $25_m$, respectively. When an enable input is "H," the output of the corresponding tri-state gates is the same as the input (either "H" or "L"). When an enable input is "L," the corresponding tri-state gate is in a "High Impedance" state. The "High Impedance" state allows the outputs of the gates to be connected together, as shown in FIG. 6, in a wired "OR" configuration to form the $\phi_1$ clock signal. Instead of tri-state gates so connected, an n-input multiplexer could also be used to form the $\phi_1$ clock signal.

Clock signal $\phi_1$ is also used to control the signals at the select terminals of multiplexer 22 and selector 23. As shown in FIG. 6, 1 to m counter 26 and 1 to n counter 27 are serially connected and provide successive select signals to multiplexer 22 and selector 23. Counter 26 receives clock signal $\phi_1$ at an output terminal. The count output of counter 26 forms the signal at the SELECT terminal of selector 23. The carry output (C) of counter 26 is an input to counter 27. The count output of counter 27 is the signal for the select terminal of multiplexer 22.

The circuit of FIG. 6 thus generates a clock signal S with pulses having uniformly increasing periods. If the frequencies of the reference clock signal $\phi_0$ and the clock signal $\phi_1$ are represented by $f_0$ and $f_1$, respectively, then the frequency $f_1$ can be expressed as follows when input i of n-input multiplexer 22 where (i is an integer between 1 and n) is selected and when enable output $E_j$ of m−output selector 23 is selected (j is an integer between 1 and m):

$$f_1 = \frac{f_0}{N} \cdot \frac{1}{K^{i-1} a^{j-1}}$$

Multiplexer 22 selects input $I_i$ when the output of the counter 27 is $i-1$, and selector 23 activates (sets at an "H" level) enable input $E_j$ when the output of the counter 26 is $j-1$. Thus the signal at $I_1$, which equals frequency $f_o$ divided by $K^{i-1}$, becomes output O of multiplexer 22 and eventually output $O_j$ of selector 23. That output is then further frequency divided by $a^{j-1} \cdot N$ to become the $\phi_1$ signal, as the equation indicates.

If K is set equal to $a^m$, then the circuit in FIG. 6 continuously generates a clock signal with a logarithmically expanding period, as the following discussion explains. Immediately after the start of the measurement, both of the outputs of the counters 26 and 27 are zero (i=j=1) the reference clock signal at input $I_1$ is frequency-divided by divider 24-1, or in other words, $$f_1 = f_0/N.$$

When one pulse of clock signal $\phi_1$ is outputted, the count output of counter 27 increases to "1," so the reference clock signal is frequency divided by frequency divider $24_2$, and a second pulse at clock signal $\phi_1$ is produced having a frequency $f_1 = (f_0/N)(1/a)$. This second clock pulse causes the output of the counter 27 to increase to "2," so the reference clock signal is frequency-divided by frequency divider $24_3$. As a result, a third pulse of clock signal $\phi_1$ is outputted having a frequency $f_1 = (f_0/N)(1/a^2)$.

The generation of $\phi_1$ continues in this manner until the (m−1)th pulse at clock signal $\phi_1$ having a frequency $f_1 = (f_0/N)(1/a^{m-1})$ is produced. The (m−1)th pulse of clock signal $\phi_1$ causes 1 to n counter 26 to reset to zero and generate a carry signal. The carry signal increments the count output to "1." Thus, i=2 and j=1, and the mth pulse at clock signal $\phi_1$ is produced with a frequency $f_1 = (f_0/N)(1/a^m)$.

The order of the generation of (i, j), is (1, 1), (1, 2), ... (1, m), (2, 1), (2, 2), ... (2, m), (3, 1), (3, 2), ... (3, m), ... (n,m).

Since the period is the reciprocal of the frequency, the relationship between the periods $t_n$ and $t_{n+1}$ is as described above:

$$t_{n+1} = a \cdot t_n$$

The maximum frequency is $f_0/N$. If, for example, $\phi_0 = 10$ MHz and N=100 (as above), then clock signal $\phi_1$ has a maximum frequency of 100 KHz. If $a=2^{\frac{1}{3}}$, the period of $\phi_1$ increases by a factor of 1.259 every clock pulse.

As is apparent from the above description, in the time measuring system of the invention, the time of an event is measured according to this invention by counting a clock pulse whose period increases in an equal ratio. Even in the case where the time of an event is relatively long or the number of events is large, the time measurement can be achieved with sufficiently high accuracy without using intricate and expensive hardware for the counter.

What is claimed is:

1. A system for measuring a time interval comprising:
    sensing means for generating a signal having a pulse period to indicate a beginning and end of said time interval;
    clock means for generating a clock signal composed of a plurality of clock pulses, each of said pulses having a pulse period which is longer than the pulse period of an immediately preceding pulse by a predetermined ratio greater than one, said pulse period of said signal generated by said sensing means being at least as long as the pulse period of each of said clock pulses; and
    counter means, coupled to said sensing means and said clock means, for counting the number of said clock pulses in said clock signal generated between the beginning and end of said time interval,
    whereby a varying log function time interval is provided for said sensing means.

2. The time interval measuring system of claim 1, wherein said sensing means includes means for generating a bilevel signal having a first level only during said time interval and at other times having a second level; and
    wherein said counter means includes
    a logic gate having one input terminal coupled to said bilevel signal generator and another input terminal coupled to said clock means for transmitting said pulses of said clock signal to a logic gate output terminal when said bilevel signal is at said first level, and for blocking said pulses of said clock signal from said logic gate output terminal when said bilevel signal is at said second level, and
    a counter coupled to said logic gate output terminal of said logic gate logic gate for counting said transmitted pulses of said clock signal.

3. The time interval measuring system of claim 1 wherein said selection control means includes:
    first counting means for counting said clock signal to form a first control signal and a carry signal, said first control signal indicating said selected one of said second frequency division ratios; and
    second counting means for counting said carry signal formed by said first counting means to form a second control signal for said first switching means identifying said selected one of said reference clock signals.

4. The time interval measuring system of claim 1 wherein said first frequency division means includes a first number of serially-connected first frequency divider circuits each having input and output terminals and each performing a frequency division of 1/K, each of said input terminals being connected to the output terminal of a different one of said frequency divider circuits, except for one of said frequency divider ciruit input terminal which is coupled to receive said fundamental reference clock signal;
    wherein said first switching means includes
    a multiplexer circuit having an output terminal, a first number of input terminals connected to said output terminals of said first frequency divider circuits and coupled to receive said reference clock signal, and a multiplexer selection input terminal coupled to receive said control signals,
    a selector circuit having an input terminal connected to said multiplexer output terminal, a second number of selected output terminals, a second number of enable terminals each corresponding to a different one of said selector circuit output terminals, and a selector selection input terminal coupled to receive said control signals for activating one of said enable terminals, and
    a second number of tri-state gates each including a gate input terminal, a state selection terminal coupled to a different one of said selector enable terminals, and a gate output terminal coupled to the gate output terminals of the other of said tri-state gates;
    wherein said second frequency divider means includes a second number of second frequency divider circuits each having an output terminal coupled to a different one of said tri-state gates and each having an input terminal coupled to the one of said selector circuit output terminals which corresponds to the selector circuit enable circuit coupled to the state selection terminal of the tri-state gate, each of said second frequency divider circuits performing a different frequency division 1/a'N; and wherein said selection control means includes first and second counters serially connected, said first counter including an input terminal coupled to receive said clock signal, a count output terminal coupled to said selector selection input terminal, and a carry output terminal, and said second counter including an input terminal coupled to the carry output terminal of said first counter and a count output terminal coupled to said multiplexer selection input terminal.

5. A system for measuring a time interval comprising:

sensing means for generating a signal having a pulse period to indicate a beginning and end of said time interval;

clock means for generating a clock signal composed of a plurality of clock pulses, each of said pulses having a pulse period which is longer than the pulse period of an immediately preceding pulse by a predetermined ratio greater than one, said pulse period of said signal generated by said sensing means being at least as long as the pulse period of each of said clock pulses, said clock means including:

first frequency division means or producing a first number of reference clock signals including said fundamental reference clock signal and a series of intermediate clock signals frequency-divided from said fundamental reference clock signal by different multiples of 1/K, where K is a positive integer, said first frequency division means being coupled to receive said fundamental reference clock signal, switching means, coupled to said first frequency division means and having a first number of input terminals each coupled to receive a different one of said reference clock signals, for transmitting a selected one of said reference clock signals at said input terminals to an output terminal, second frequency division means, coupled to said output terminal of said switching means, for generating said clock signal by frequency-dividing said selected reference clock signal at said switching means output terminal by a selected one of a second number of frequency division ratios 1/a'N, where a is said predetermined ratio, N is a positive integer, and j is an integer between 1 and said second number, selection control means, coupled to said switching means and said second frequency division means, for generating control signals to identify said selected one of said reference clock signals for said first switching means and for indicating said selected one of said second number of frequency division ratios in said second frequency division means; and counter means, coupled to said sensing means and said clock means, for counting the number of said clock pulses in said clock signal generated between the beginning and end of said time interval, whereby a varying log function time interval is provided for said sensing means.

* * * * *